(12) United States Patent
Zhang et al.

(10) Patent No.: US 9,710,926 B2
(45) Date of Patent: Jul. 18, 2017

(54) IMAGE PROCESSING OF A RETAIL SHELF AREA

(71) Applicant: Hewlett-Packard Development Company, L.P., Houston, TX (US)

(72) Inventors: Tong Zhang, Palo Alto, CA (US); Jian Fan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 14/609,741

(22) Filed: Jan. 30, 2015

(65) Prior Publication Data

US 2016/0224857 A1 Aug. 4, 2016

(51) Int. Cl.
| | |
|---|---|
| *G06K 9/00* | (2006.01) |
| *G06T 7/40* | (2017.01) |
| *G06K 9/62* | (2006.01) |
| *G06T 7/00* | (2017.01) |
| *G06T 7/90* | (2017.01) |
| *G06K 9/46* | (2006.01) |

(52) U.S. Cl.
CPC .......... *G06T 7/408* (2013.01); *G06K 9/00771* (2013.01); *G06K 9/4638* (2013.01); *G06K 9/629* (2013.01); *G06T 7/0008* (2013.01); *G06T 7/90* (2017.01); *G06K 9/4652* (2013.01); *G06K 2009/4666* (2013.01)

(58) Field of Classification Search
CPC ................... G06T 7/408; G06T 7/0081; G06T 2207/10024; G06K 9/4652; G06K 9/00691; G06F 17/3025; G06Q 10/087
See application file for complete search history.

(56) References Cited

U.S. PATENT DOCUMENTS

| | | | |
|---|---|---|---|
| 8,630,924 B2 * | 1/2014 | Groenevelt | .......... G06Q 10/087 211/90.01 |
| 2013/0051667 A1 * | 2/2013 | Deng | ................. G06K 9/00691 382/168 |
| 2013/0300729 A1 | 11/2013 | Grimaud | |
| 2014/0003729 A1 | 1/2014 | Auclair et al. | |
| 2014/0129395 A1 * | 5/2014 | Groenovelt | .......... G06Q 10/087 705/28 |
| 2014/0201040 A1 | 7/2014 | Birch | |

* cited by examiner

*Primary Examiner* — Duy M Dang
(74) *Attorney, Agent, or Firm* — Mahamedi IP Law LLP

(57) ABSTRACT

A system and method for processing an image of a retail shelf area. According to one aspect, a portion of an image that depicts the retail shelf area at an angled and depthwise perspective is determined to depict shelves. The image can be modified so that the portion of the image determined to depict shelves is substantially parallel to a predefined horizontal reference frame. Products can then be detected in the remainder portion of the image, separate from the portion of the image determined to depict shelves. An applicable planogram can be used to generate compliance information based on the detected products and the determined portion of the image depicting shelves.

14 Claims, 13 Drawing Sheets

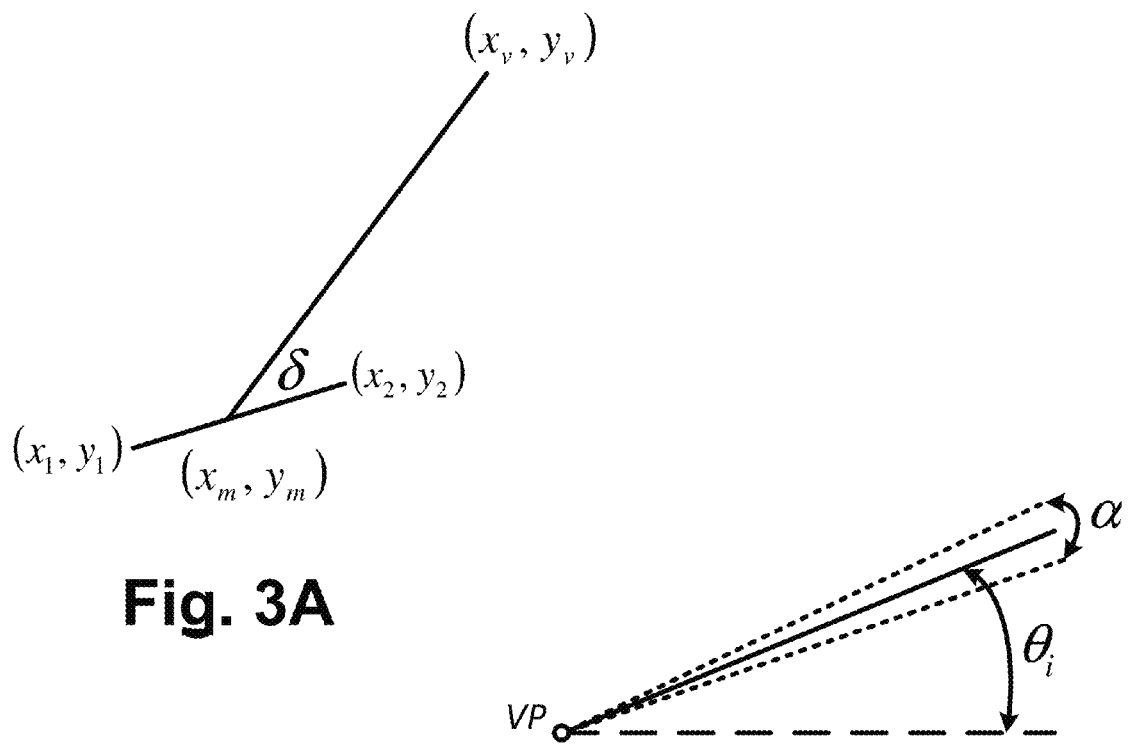
Fig. 3A
Fig. 3B
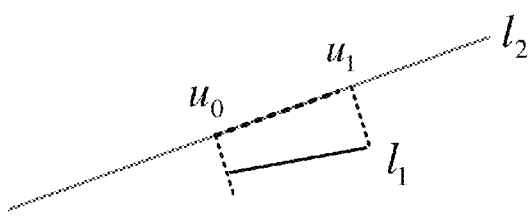
Fig. 3C

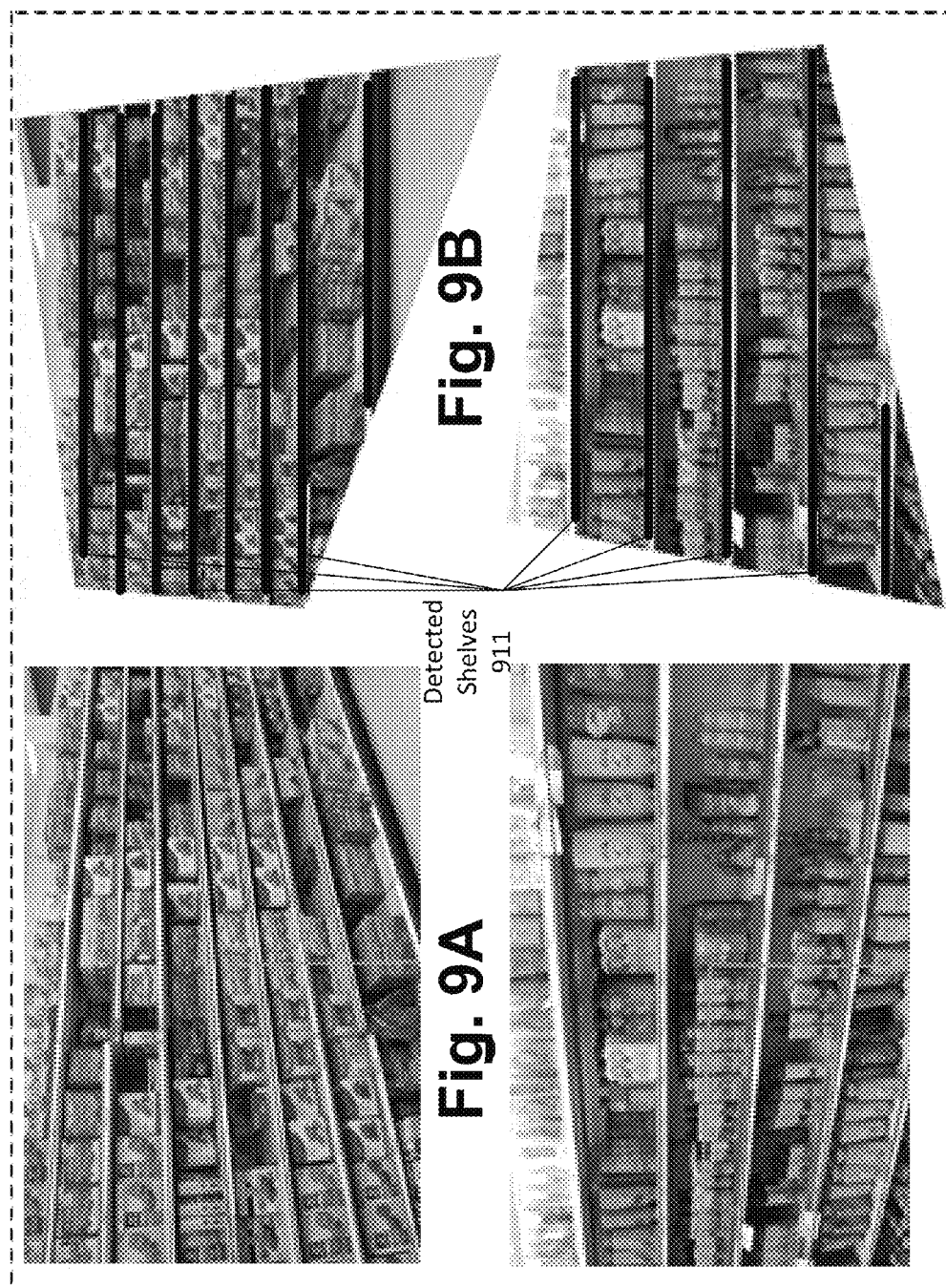

IMAGE PROCESSING OF A RETAIL SHELF AREA

BACKGROUND

Retailers typically are obligated to monitor products on store shelves in order to maintain adequate stocking and in many cases comply with a placement arrangement defined by a planogram due to contractual requirements with manufacturers and distributers. The monitoring of store shelves is important for efficient utilization of shelf space and for ensuring compliance of shelf layout with a planogram.

BRIEF DESCRIPTION OF THE DRAWINGS

FIG. 3A through FIG. 3C illustrates geometrical representations relating to shelf detection in an image of a retail shelf area.

FIG. 9A through FIG. 9D illustrate example images for image rectification of an image of a retail shelf area.

DETAILED DESCRIPTION

Figure 1:
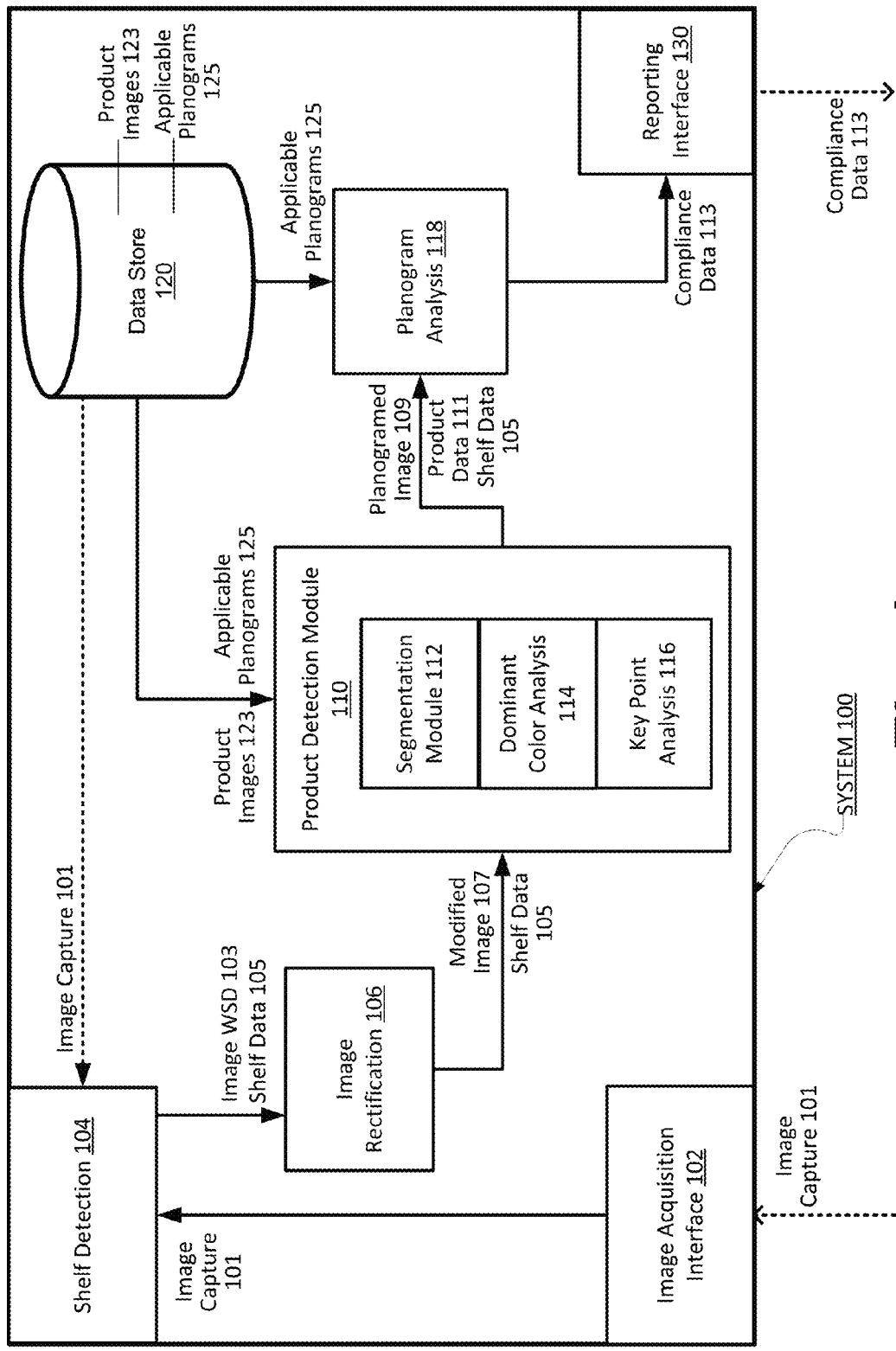
FIG. 1 illustrates an example system for processing an image of a retail shelf area to generate compliance information about applicable planograms.

Examples described herein include a system and method for processing an image of a retail shelf area, the image depicting the retail shelf area from a different perspective than a unified frontal view.

According to one aspect, the processing can be implemented on a received image depicting the retail shelf area at an angled and depthwise perspective in relation to the point of image capture. An angled and depthwise image of a retail shelf area can be defined as an image depicting the shelves in a particular aisle, which is captured from a device that is closer to one end of the aisle and pointed at the other end of the aisle. The image can be captured by a camera on a mobile computing device or by any other camera used by the store clerks or representatives of the distributers and manufacturers of certain products, who can then send the image to the system for processing. Alternatively, a video camera mounted to monitor the retail shelf area can periodically send image captures to the system for processing.

Further to this aspect, a portion or portions of the image can then be determined to depict one or more shelves in the retail shelf area. Based on this determination, the image can be modified so that the portions of the image determined to depict the one or more shelves are substantially parallel to a predefined horizontal reference frame. In one example, the horizontal reference frame can be predefined so that the image is modified to show a unified frontal view of the retail shelf area. In another example, the horizontal reference frame can be predefined so that the portion of the image determined to depict the one or more shelves is substantially parallel to the horizontal boundaries of the page, device or display showing the modified image. The modified or rectified image can be looked like it was taken from a frontal view angle and the detected shelves can appear horizontal.

In an example, the determination of the portions of the image that depict one or more shelves and the modification of the image to rectify the perspective can be done using edge/line segment detection combined with vanishing point image processing techniques. Radial projection that measures the coverage of the field of view of the detected line segments can also be used to accurately detect the portions of the image that depict the one or more shelves. Vertical vanishing point analysis and homographic transformation techniques can be used to modify the image with the detected shelves to rectify the perspective to a frontal view.

In a further aspect, one or more products can be detected in the remainder portion of the modified image, the remainder portion being the remaining portion of the image apart from the portion that is determined to depict the one or more shelves. The detection of these one or more products can include identifying or segmenting the remainder portion of the image into a plurality of patches or candidate image portions and then analyzing each of the patches or candidate image portions to determine a shelved product in each of the candidate image portions that corresponds to one of a plurality of stored product images.

In some aspects, the analysis of each of the patches or candidate image portions to determine a shelved product can be based on a dominant color present in the candidate image portions. In an alternative example, the analysis of each of the patches or candidate image portions can be based on a local feature matching or key point analysis in the candidate image portions, when comparing the candidate image portions with the plurality of stored product images.

In further aspects, the analysis of each of the candidate image portions to determine a shelved product can involve two steps. First, a dominant color can be identified in each of the candidate image portions and the images of products in the stored product images that do not contain the identified dominant color are excluded for the basis of comparison. Second, a number of key points in each of the candidate image portions are identified and compared to the key points in each of the plurality of stored product images filtered by excluding the product images that do not contain the identified dominant color. In one example, the dominant color can be the color that is closest to the center of the candidate image portion. In another example, the dominant color can be the color that is in more than 50% of the candidate image portion. The number of key points to be matched can be a predefined threshold number.

In another aspect, the analysis of each of the candidate image portions to determine a shelved product can be based on an applicable planogram. The applicable planogram can be identified based on the image of the retail shelf area. The applicable planogram can be a predefined arrangement of specific target products on the shelves in the retail shelf area depicted in the image. Alternatively, the applicable planogram can be based on a percentage of shelf space dedicated for specific target products on the shelves in the retail shelf area depicted in the image. Based on the applicable planogram, one or more target products can be filtered from the plurality of stored product images to narrow down the potential products that can be detected in the candidate image portions.

In further aspects, after the one or more products are detected in the remainder portion of the modified image, the applicable planogram is identified to generate compliance information. The compliance information can be generated based on identifying discrepancies between the applicable planogram and the arrangement of products or shelf usage of the retail shelf area based on the determined portion of the image that depicts the one or more shelves and the one or more products detected in the remainder portion of the modified image.

By employing the various image processing techniques described herein in the context of shelf detection, image rectification, product detection and planogram analysis, a complete solution for shelf monitoring and planogram compliance is presented that is more accurate and practical than existing solutions.

As used herein, "substantially parallel" refers to elements that are visually parallel or estimated to be parallel by the naked eye. The term "substantially" is intended to mean at least 80% of a stated quantity or relationship.

As used herein, "candidate image portions" refer to blocks of the image that potentially could depict one or more products shelved in the retail shelf area. "Candidate image portions" and "patches" or "patch" refer to the same and are used interchangeably in the disclosure herein.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

FIG. 1 illustrates an example system for processing an image of a retail shelf area to generate compliance information about applicable planograms. The system 100 includes at least an image acquisition interface 102, shelf detection module 104, image rectification module 106, product detection module 110, planogram analysis module 118, data store 120, and reporting interface 130. In some aspects, the product detection module 110 can include segmentation module 112, dominant color analysis module 114 and key point analysis module 116.

System 100 can reside as an application on the mobile computing device that captures the image of the retail shelf area or could reside remotely on a server. The system 100 can also be a part of a monitoring system in retail stores that uses a video camera mounted to monitor the shelves. Alternatively, the system 100 can be used by distributers and manufacturers as a stand-alone monitoring apparatus that incorporates an image capture device.

In more detail, image acquisition interface receives an image capture 101 for processing. Image capture 101 can be taken on any device capable of creating digital images, such as a digital camera or image scanner. An image scanner, for example, can be a flatbed scanner that optically scans images (such as developed photographs from a film camera), or objects and converts the input into a digital image. Handheld cameras and 3D scanners are also examples of a device that can provide image capture 101. Furthermore, image capture 101 can be received from a device that is a component in a larger device, such as an all-in-one printer with a built-in scanner or a mobile phone with a digital camera. Image capture 101 can also be a frame from a video camera that is mounted to monitor the shelves. Image capture 101 can be any file format including but not limited to JPEG (Joint Photographic Experts Group), TIFF (Tagged Image File Format), EXIF (Exchangeable Image File Format), BMP (Windows Bitmap), RIF (Raw Image Format), PNG (Portable Network Graphics) or any other format that the image is saved in by the image capture device that is used.

Alternatively, image capture 101 can be images that are stored in and provided from data store 120. Data store 120 can represent a transient storage medium or a permanent storage medium. For example, data store 120 may be random access memory (RAM) or a computer disk drive, solid state drive, flash memory, etc. The stored product images 123 or model images of shelved/target products and applicable planograms 125 can also be stored in data store 120. Additionally, the modified images from intermediate steps in system 100 can also be temporarily stored in data store 120 to aid in processing as needed.

For optimum processing of the retail shelf area, the image should depict the shelves from a frontal view captured from a point that is perpendicular to the horizontal shelves in the retail area. However, this is not always possible due to the narrowness of the aisles and other obstructions that may make it impossible to get the whole picture of the retail shelf area in the image. Image capture 101 in system 100 can depict the retail shelf at an angled and depthwise perspective, a view that can easily be captured by a person walking from one aisle to another. FIG. 9A and FIG. 9C show examples of images depicting the retail shelf area with such a perspective.

After receiving the image capture 101, image acquisition interface 102 sends the image capture 101 directly to shelf detection module 104 for processing or stores the image in data store 120 for later use. Shelf detection module 104 determines the portions of the image that depict one or more shelves in accordance with the method described in the context of FIG. 3 below. The data represented the detected shelves (shelf data 105) and the image with shelves detected (Image WSD 103) can then be sent to the image rectification module 106.

After receiving the Image WSD 103, image rectification module 106 can use shelf data 105 to modify the image in accordance with the method described in the context of FIG. 4 below. The modified image 107 can be rectified so that the portions of the image determined to depict shelves is substantially parallel to a predefined horizontal reference frame. The horizontal reference frame can be defined in such a way that the modified image shows the frontal view of the retail shelf area. The detected shelves (represented by shelf data 105) can also be transformed in the modified image 107 using the same technique. The modified image 107 can then be sent to the product detection module 110 along with shelf data 105.

Once the product detection module 110 receives the modified image 107 and shelf data 105, the remainder portion of the image, separate from the portion of the image determined to depict the one or more shelves can then be segmented into patches or candidate image portions by segmentation module 112. The segmentation is described more in detail in the context of FIG. 5 below. Product detection module 110 can also receive stored product images 123 of shelved/target products and applicable planograms 125 from data store 120. According to one example, dominant color analysis module can use the stored product images 123 to filter the images of products with a dominant color that matches the dominant color in the candidate image portions. According to another example, key point analysis module 116 can also use the stored product images 123 to determine the one or more product depicted in the candidate image portions. The techniques used by dominant color analysis module 114 and key point analysis module 116 are described further in detail in context of FIG. 5 below. Product detection can be performed using either the dominant color analysis 114 or key point analysis 116 or a combination of both. Dominant color analysis 114 can be used to narrow the number of stored product images that can be matched before performing key point analysis 116 on the filtered product images to determine a shelved product.

In another aspect, an applicable planogram 125 can be identified based on the modified image of the retail shelf area and the metadata associated with the image. Based on the applicable planogram, stored product images 123 of target products in the applicable planogram can be filtered to aid in product detection. Dominant color analysis 114 or key point analysis 116 or both in combination can then use the filtered stored product images of the target products to determine a target product in each of the candidate image portions.

Once all the candidate image portions are analyzed to determine a shelved/target product, a planogramed image 109 is generated using product data 111 to depict the determined shelved/target products on the portions determined to depict the one or more shelves in the modified image 107. The planogramed image 109 can be an image with product data 111 superimposed on the modified image 107. Consecutive patches or candidate image portions on a detected shelf that are recognized as having the same shelved/target products can be merged together to form blocks. Using product data 111 and shelf data 105, location and sizes of these product blocks can be used to generate the planogramed image 109.

Planogram analysis module 118 can then receive planogramed image 109, shelf data 105, applicable planogram 125 and product data 111 from the product detection module 110. Planogram analysis module 118 can also receive applicable planogram 125 from data store 120 if applicable planogram 125 was not used in the product detection module 110 according to some aspects. Planogramed image 109 and applicable planogram 125 can then be compared to identify discrepancies and generate compliance data 113, which can then be reported out by system 100 through the reporting interface 130.

Compliance data 113 can include information and discrepancies about the layout of the product display on one or more shelves, estimation of shelf product shares and indications of gaps in product display. Compliance data 113 can be reported graphically using the layout of the applicable planogram 125 or can be reported as data formatted for a specific system designed to read such information. Compliance data 113 may also be reported in a textual format with description of discrepancies in the applicable planogram 125 using product data 111 and shelf data 105.

A system such as described with an example of FIG. 1 can be implemented using a variety of computer systems, including a standalone computer (e.g., workstation or server), combination of servers or other networked computers, a client computer (e.g., mobile computing device) or on a distributed computing environment (e.g., as between client and server). In some variations, at least some components shown in system 100 can be implemented on a mobile computing device, such as a wireless computing device capable of cellular telephony and messaging and/or other wireless communications (e.g., 802.11(a), (b), (g), or (n); collectively "Wi-Fi"). As an addition or alternative, some components of system 100 can be implemented on a server or network service. While some examples provide for system 100 to be implemented entirely on a server or other network computer, variations provide that the system 100 can be distributed between a client computer (e.g., mobile computing device) operating on-site (e.g., at the point of capture) and one or more servers which are in communication with the client computer. The mobile computing device can include, for example, a multifunctional cellular/telephony device (e.g., smartphone, feature phone), tablet, laptop or netbook, or hybrid device (e.g., tablet-laptop hybrid or "phablet").

Methodology

Figure 2:
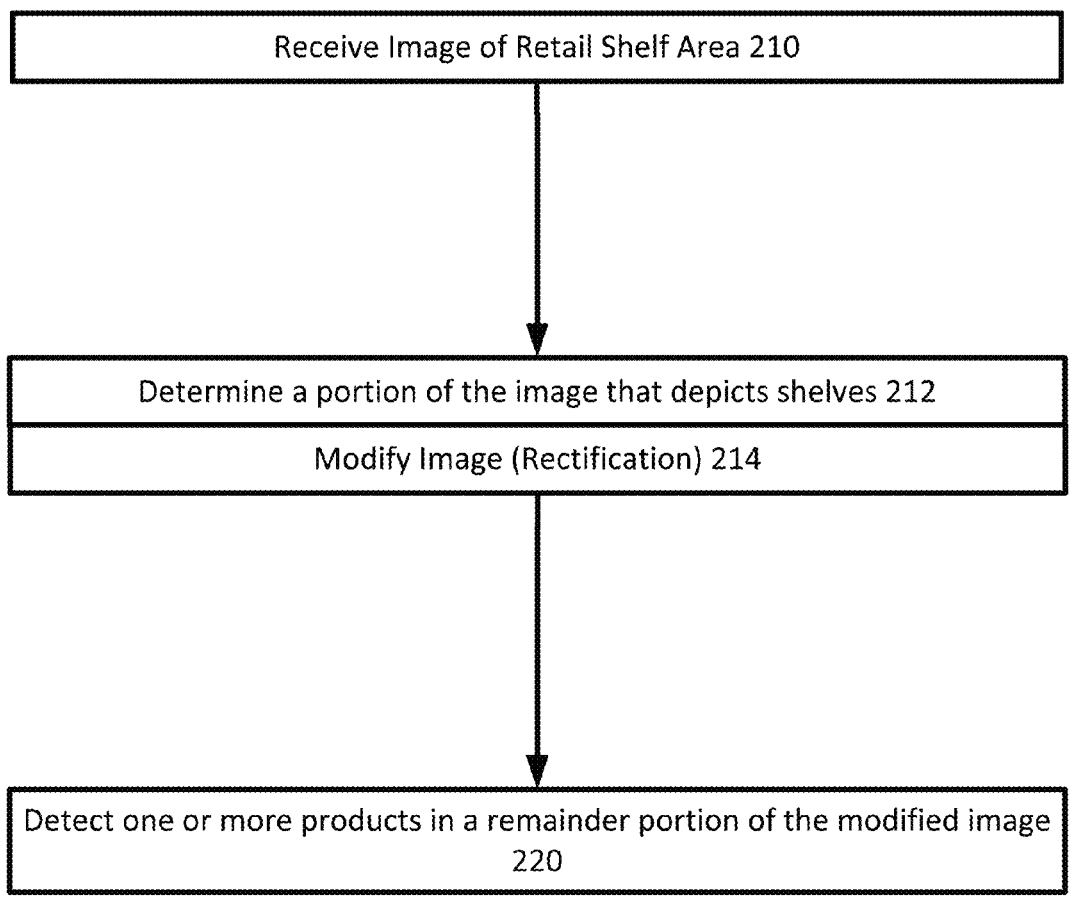
FIG. 2 illustrates an example method for processing an image of a retail shelf area.

FIG. 2 illustrates an example method of processing an image of a retail shelf area. According to one aspect, the method for processing an image of a retail shelf area can include three major steps once the image is received by the system (210). First, one or more shelves are determined to be depicted in a portion of the image in accordance with shelf detection (212) described in the context of FIG. 3 below. Second, the image is rectified so that the portion of the image depicting the one or more shelves is substantially parallel to a predefined horizontal reference frame in accordance with image rectification (214) described in the context of FIG. 4 below. Third, one or more products are detected in a remainder portion of the rectified image, the remainder portion being separate from the portion of the image determined to depict the one or more shelves. The detection of the one or more products is performed in accordance with product detection (220) described in the context of FIG. 5 below.

Figure 3:
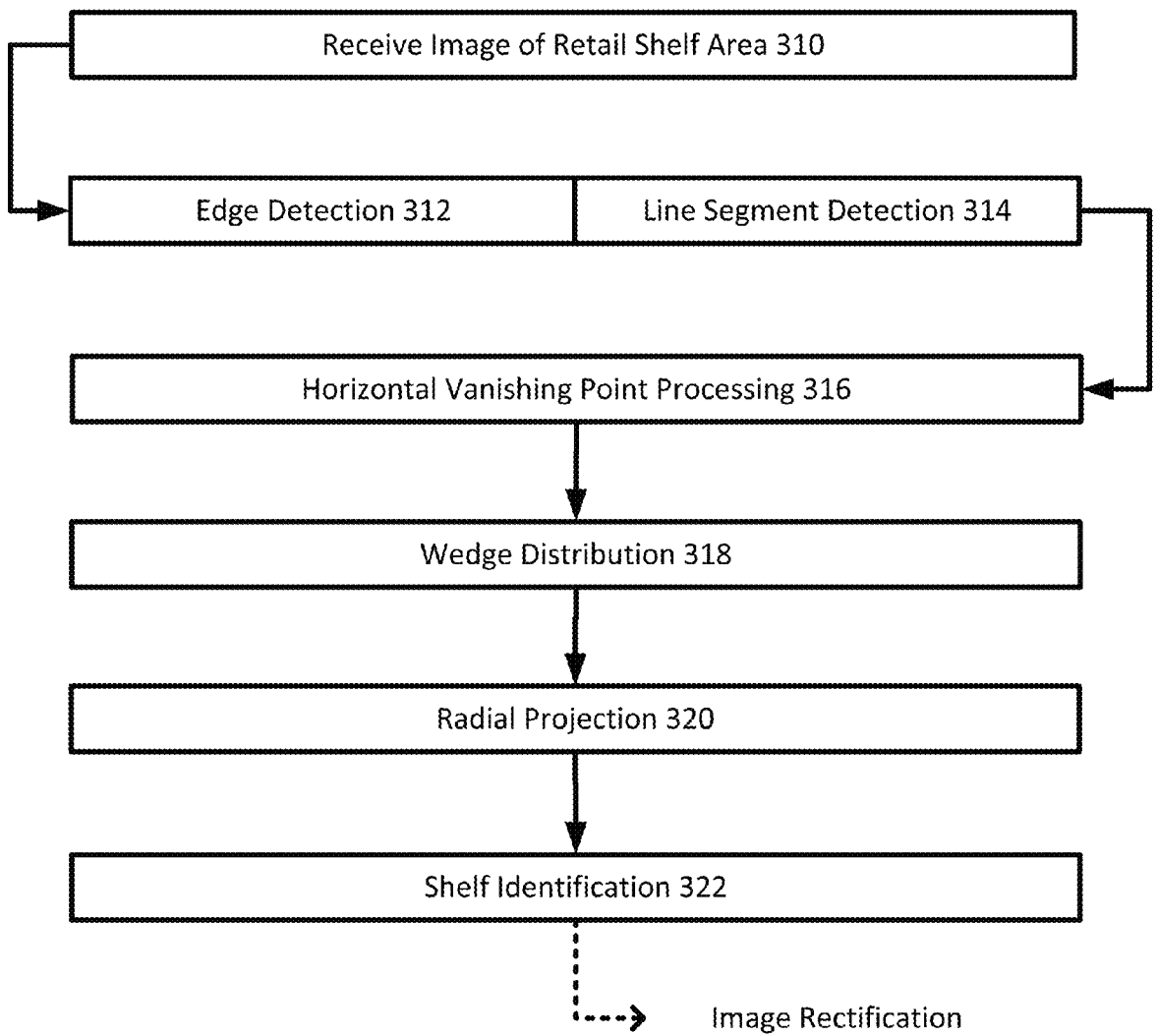
FIG. 3 illustrates an example method for detecting shelves in an image of a retail shelf area.

FIG. 3 illustrates an example method for shelf detection, in accordance with some aspects. Once the image of the retail shelf area is received (310), edges and line segments are first detected. To detect edges (312), a conventional edge detecting technique can be used, e.g. a Canny-type edge detector. To take advantage of color information, the gray-scale gradient operator can be replaced with a color gradient operator.

Once the edges are detected, an edge-following approach can be used to detect line segments from edges (314). In one example, an edge-following procedure starts from an unvisited edge pixel by checking the eight neighbors from the current edge pixel location. A new edge pixel is then added to the collection if it satisfies the following conditions: 1) it is at an unvisited location, 2) its gradient orientation is within a set range relative to the existing collection, and 3) the new collection of points still fits to a line with a given criterion. These steps can be repeated until no new edge pixel can be added. In general, a shelf can consist of multiple line segments due to lens-induced geometric distortion, disjointed shelves or image noise. The shelf detection technique described herein does not require linking of line segments.

After the edges and line segments have been detected, horizontal vanishing points are identified (316). In an example, the image plane can be represented as z=1, and two line segments $l_1$ and $l_2$ on the image plane can be defined as:

$$l_1: \vec{p}_1=(x_1,y_1,1) \leftrightarrow \vec{p}_2=(x_2,y_2,1)$$

$$l_2: \vec{p}_3=(x_3,y_3,1) \leftrightarrow \vec{p}_4=(x_4,y_4,1)$$

The three points $(0,0,0)$, $\vec{p}_1$, and $\vec{p}_2$ form a three-dimensional plane, and likewise, the three points $(0,0,0)$, $\vec{p}_3$ and $\vec{p}_4$ form another three-dimensional plane. The intersection of the two planes can then be defined as the vanishing line, and it can be shown that the direction vector of the vanishing line is:

$$\vec{v} = \frac{(\vec{p}_1 \times \vec{p}_2) \times (\vec{p}_3 \times \vec{p}_4)}{|(\vec{p}_1 \times \vec{p}_2) \times (\vec{p}_3 \times \vec{p}_4)|}$$

where the symbol x represents the vector cross-product and ∥ represents the vector norm. If the vanishing line is not parallel to the image plane ($v_z \neq 0$), the vanishing point at the image plane can be computed by $x_v=v_x/v_z$ and $y_v=v_y/v_z$.

For a line segment in the image plane with two end points $(x_1, y_1)$ and $(x_2, y_2)$, the closeness to a vanishing point can be defined as the angle between the line segment and the line connecting the vanishing point and the midpoint of the segment, as illustrated in FIG. 3A.

Up to 500 vanishing points can be randomly selected and used as accumulator cells. All the horizontal line segments can then be projected into the cells and the one with the highest accumulated value is then considered the vanishing point of the shelves.

Once the vanishing point is identified, the image can then be divided into equally spaced wedges centered at the vanishing point (318). The number of wedges should at least double the number of shelves according to a sampling theorem for optimal shelf detection. A wedge $w_i$ is specified by a center line at angle $\theta_i$ and two border lines at angles $(\theta_i-\alpha/2)$ and $(\theta_i+\alpha/2)$, as illustrated in FIG. 3B. The center line of a wedge (referred to as wedge lines) intersects with image boundaries at two points $p_1^i$ and $p_2^i$. The line interval $[p_1^i; p_2^i]$ is then assumed to be the intersection of $w_i$. The length $L_i$ of the intersection varies depending on the angle $\theta_i$ of the line.

After the wedges are distributed on the image, radial projection can be used to estimate the location of the shelves (320). A line segment can be projected onto a wedge if the angle between the line and the wedge line is within the range of $\pm\alpha/2$.

FIG. 3C illustrates a line segment $l_1$ projected onto the line $l_2$. The projected interval can be denoted as $\overrightarrow{u_0u_1}$ using line $l_2$ as the new axis. Each wedge $w_i$ can be associated with an array of integer counters $C_i$ with $\lfloor L_i \rfloor$ elements, where $\lfloor x \rfloor$ stands for the floor function and $L_i$ is the length of the intersection.

The counters can then be initialized to zero. For every line $l_j$ projected to the wedge, the corresponding counters within the indices of $\lfloor u_0 \rfloor$ and $\lfloor u_1 \rfloor$ of $C_i$ can then be incremented by one. After taking all the projections into account, a zero at $C_i[k]$ indicates a gap.

The projection of multiple lines onto a wedge $w_i$ can then be measured according to aspects that include:

1. The maximum projected length $PL_{max}^i$. This is measured as the maximum length of projected segment length $PL_{max}^i=\max\{\overline{u_{i,j}u_{i,j+1}}\}$.
2. Coverage of the intersection $CI_i$. This is a normalized metric measured as the total number of non-zero counters $C_i$ over the length $L_i$.
3. The sum of distance-weighted projected length $S_i$. This metric is computed as:

$$S_i = \sum_j \frac{\overline{u_{i,j}u_{i,j+1}}}{(1+d_{i,j}+d_{i,j+1})},$$

where $d_{i,j}$ and $d_{i,j+1}$ is the distance from the two end of the line segment $l_j$ to the wedge's center line $l_i$.

Utilizing the above measures, shelves can then be identified (322) as being depicted in the image through the following two steps:

1. Identifying and flagging wedges that satisfy the criteria $(PL_{max}^i>TH_1) \wedge (CI_i>TH_2)$.
2. For a group of consecutive flagged wedges, computing a weighted average angle using the metrics $\{S_i\}$ computed above.

Figure 8A:
FIG. 8A and FIG. 8B illustrate example images for shelf detection in an image of a retail shelf area.
Figure 8B:
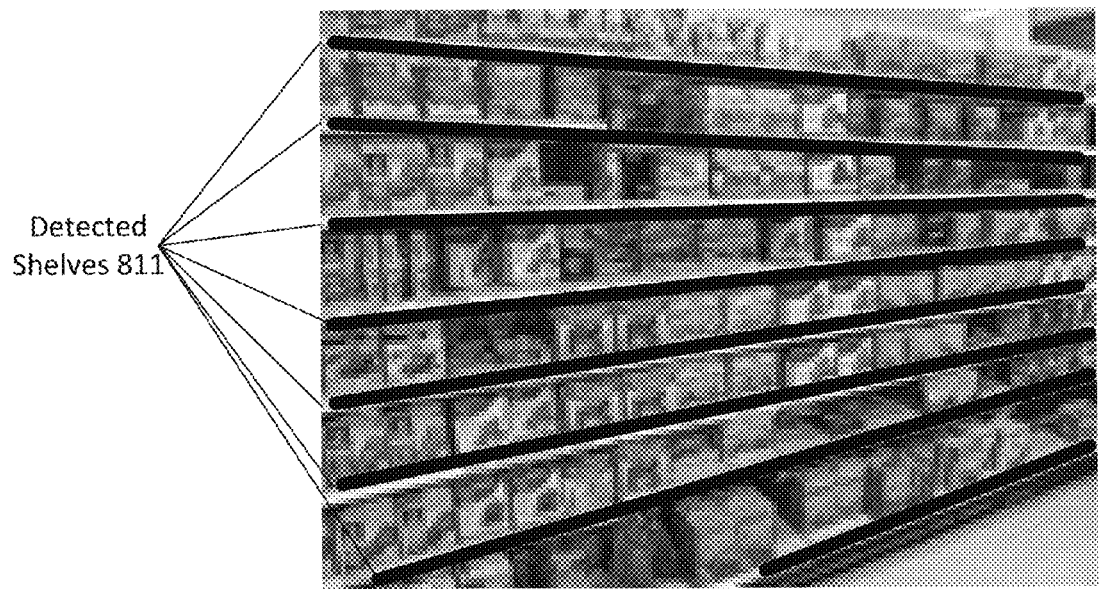

FIG. 8A and FIG. 8B show an example of the portions of the image determined to depict shelves (811) in an image of a retail shelf area. Once the shelves are identified, the image can then be modified using image rectification to aid in product detection and planogram analysis. One or more aspects including computations involving the equations described above may be implemented through the use of instructions that are executable by one or more processors accessing data that is stored in a data store.

Figure 4:
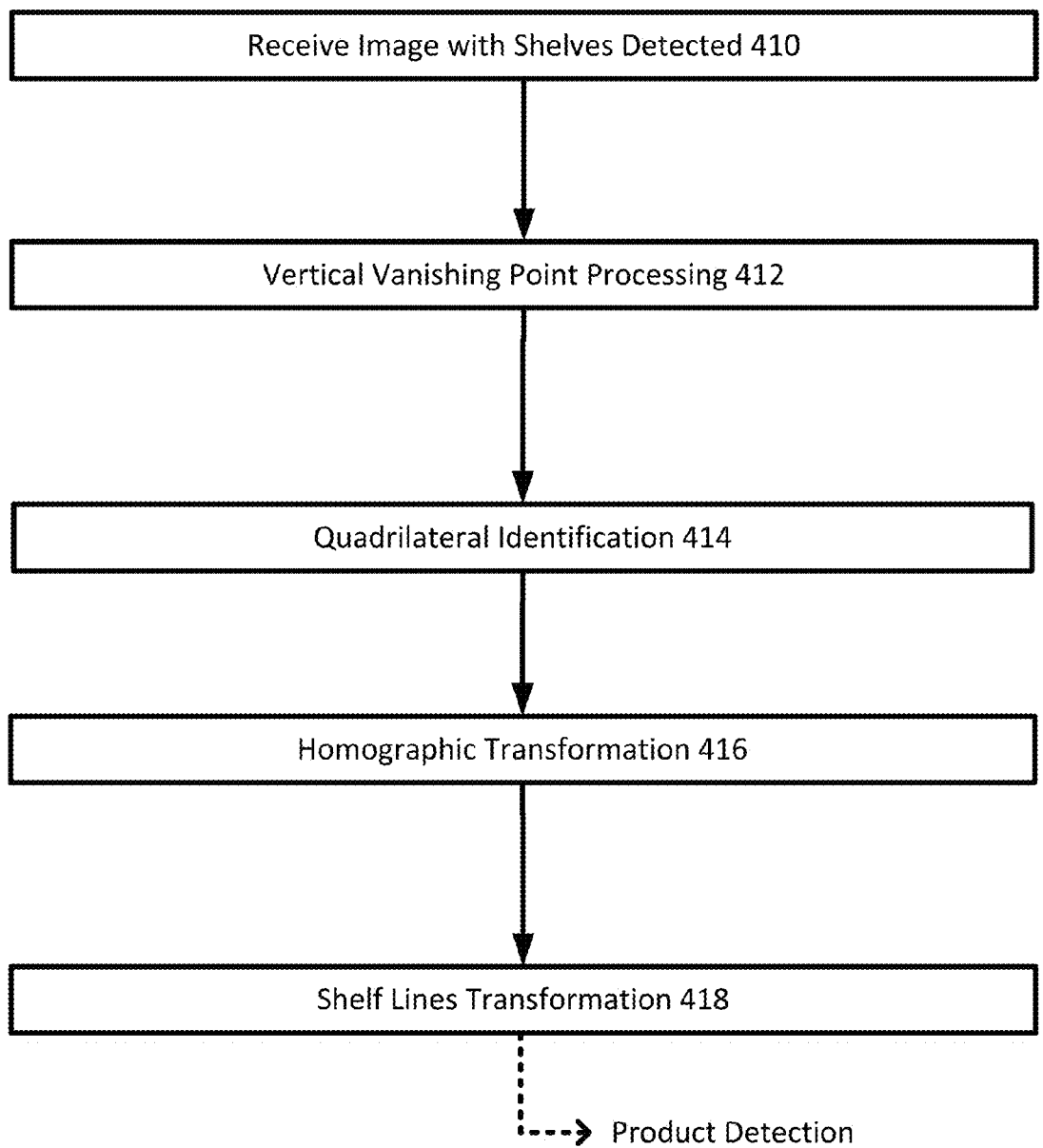
FIG. 4 illustrates an example method for rectifying an image of a retail shelf area.

FIG. 4 illustrates an example method for image rectification, in accordance with some aspects. First, the vertical vanishing points in the image are determined (410). For example, the determination of the vertical vanishing point, it can be assumed that the items on the shelves have vertical edges that are perpendicular to shelves in the 3D world coordinate. With the pin-hole camera model, the horizontal and vertical vanishing points can then have the relationship:

$$(x_{v1} \cdot x_{v2} + y_{v1} \cdot y_{v2}) + f^2 = 0,$$

where $(x_{v1}, y_{v1})$ and $(x_{v2}, y_{v2})$ are the location of the two vanishing points in the two-dimensional image plane, and f is the camera focal length.

Utilizing the horizontal vanishing point detected in steps described above and the focal length retrieved from the EXIF data of image file, the vertical vanishing point can be computed. For every candidate vanishing point that is computed, the measure λ can be determined by:

$$\lambda = (x_{v1} \cdot x_{v2} + y_{v1} \cdot y_{v2}) + f^2$$

The vanishing point with the minimum λ value can then be chosen as the vertical vanishing point.

Figure 4A:
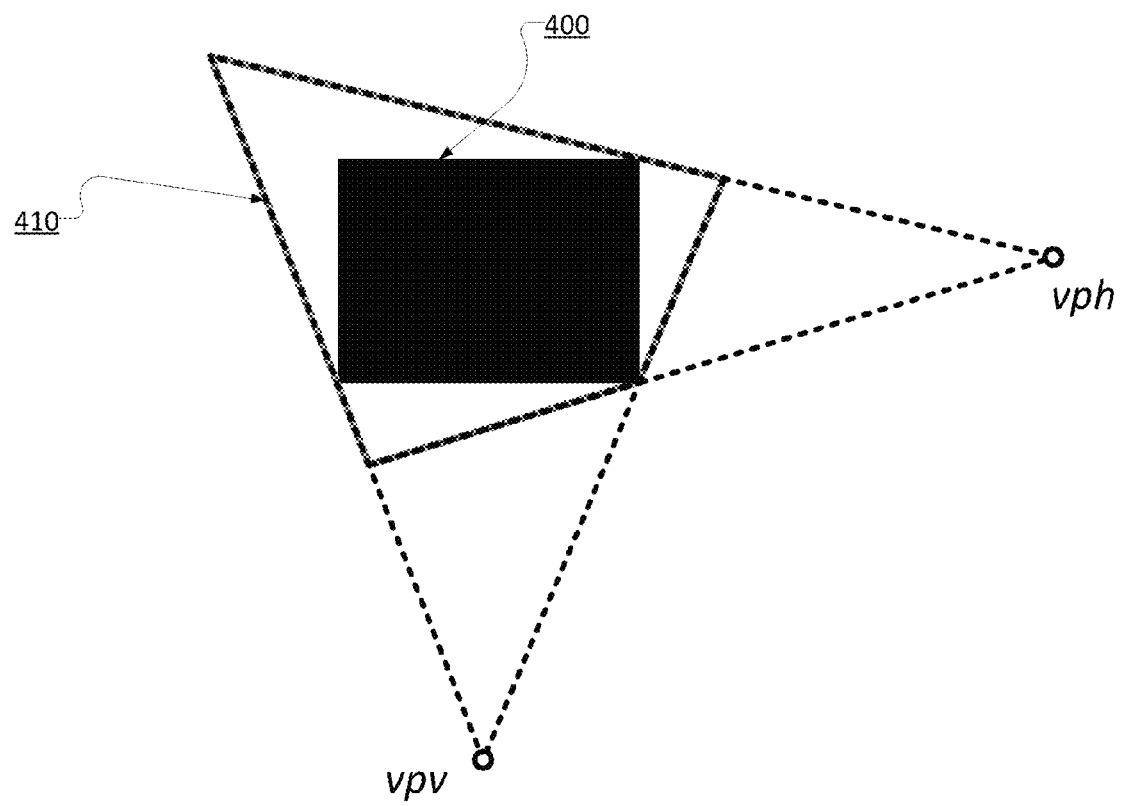
FIG. 4A illustrates an example quadrilateral identified through the vanishing point analysis used in shelf detection and image rectification.

Once the vertical vanishing point is determined, a quadrilateral created by the two vanishing points is identified (412). FIG. 4A illustrates an example of a quadrilateral identified through the two vanishing points vph and vpv. The quadrilateral 400 in FIG. 4A is created by the two perpendicular vanishing points and the image corners. For the rectification of the image, the quadrilateral area can then be wrapped into a rectangle 410 using homographic transformation (414) by estimating the aspect ratio of the rectangle 410 from the quadrilateral or from the two vanishing points and the focal length of the camera used to capture the image. The same homographic matrix can then be used to transform shelf lines (416) detected from the original image to the modified image. FIG. 9A through FIG. 9D show examples of images depicting a retail shelf area modified using the above described process. FIG. 9B and FIG. 9D illustrate the modified images of FIG. 9A and FIG. 9C respectively after the shelf detection and image rectification steps described above. One or more aspects including computations involving the equations described above may be implemented through the use of instructions that are executable by one or more processors accessing data that is stored in a data store.

Figure 5:
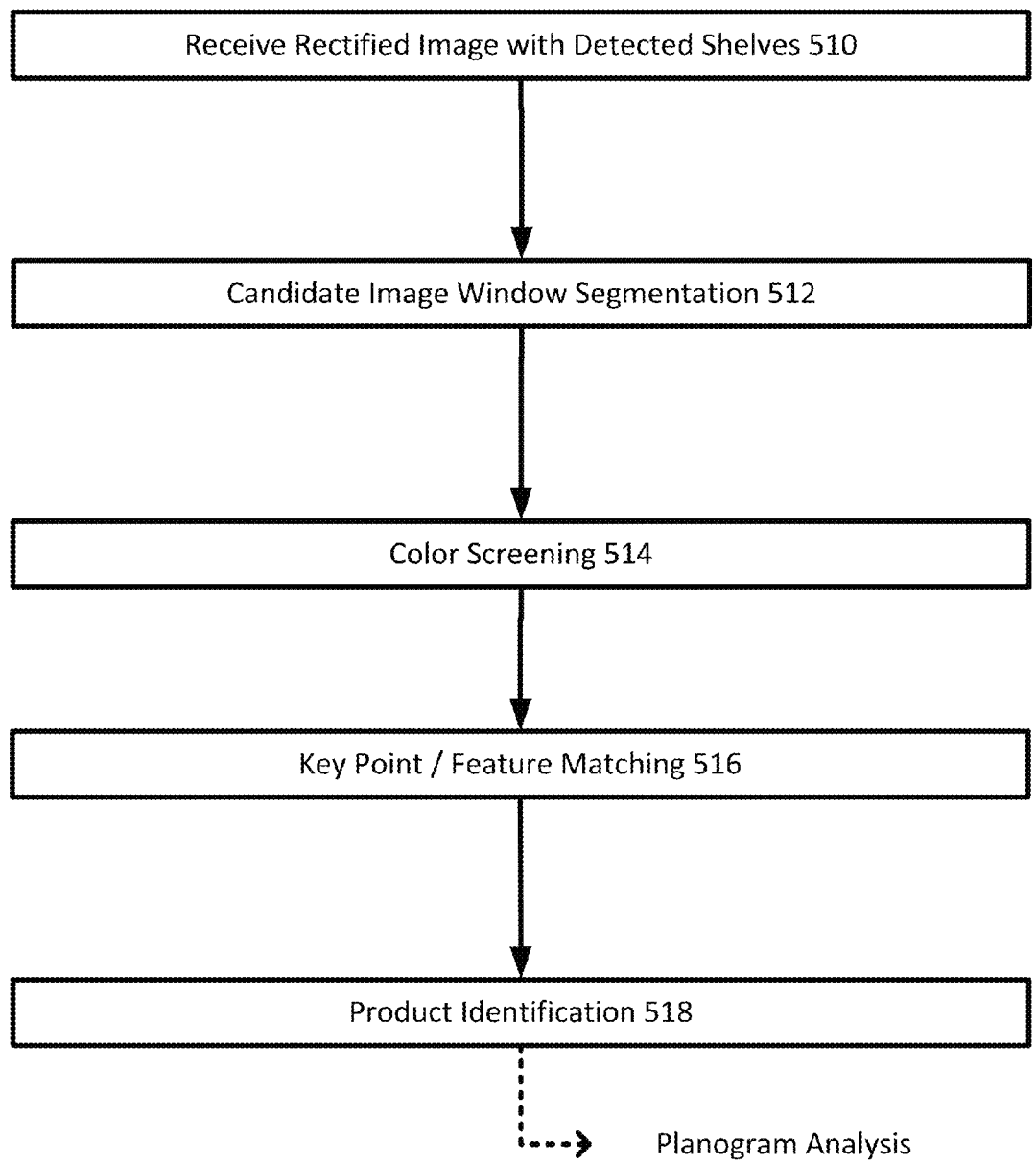
FIG. 5 illustrates an example method for detecting products in an image of a retail shelf area.

FIG. 5 illustrates an example method for product detection, in accordance with some aspects. Once the image is rectified and segmented into shelf layers (remaining portion of the image between the portions of the image determined to depict shelves), the shelf layers can then be segmented into patches and candidate image portions can be identified (510). Candidate image portions are referred to the blocks of the image that potentially could depict one or more products shelved in the retail shelf area. A sliding window technique can be used to identify the candidate image portions, preferably by setting the height of the sliding window to be 0.85 of the height of the shelf layer for optimum product detection. The window's aspect ratio can be set to be the same as the model image of a target product according to some aspects. The window's moving step can be set to be 0.3 of the window's width in order to find a good balance between accuracy and speed.

Figure 10:
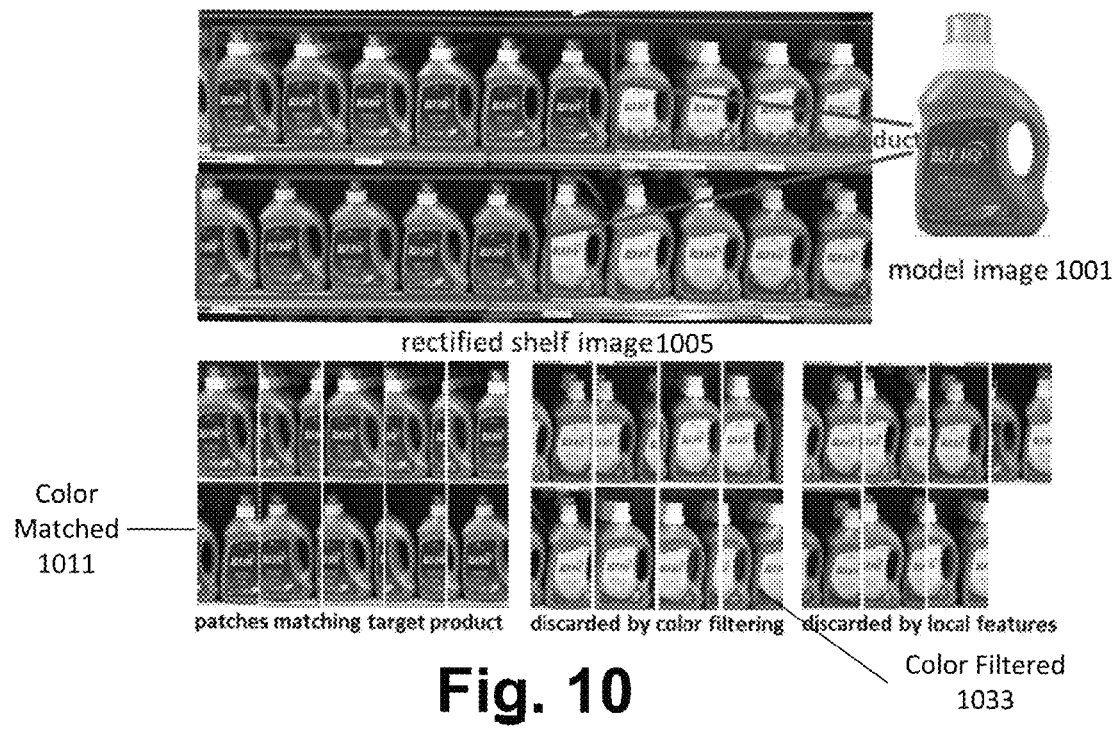
FIG. 10 illustrates example images showing color filtering for product detection.

After the candidate image portions are identified, each candidate image portion can first be screened by matching the color in the stored product images (512), according to some aspects. For example, two color features can be used. A weighted gray scale histogram of the image can be used, in which pixels are weighted by their closeness to the image center. Alternatively, the color layout represented by a concatenation of dominant colors in sub regions of the image can be used for filtering. With properly selected thresholds, positive patches are kept for the next step in the process, while negative patches (which can be more than 50% of all patches) can be discarded according to some aspects. FIG. 10 shows example images of patches that are filtered through color matching as described above. In an alternate example, products can be determined based solely on the color matching process described here.

Once the candidate image portions are color filtered and assuming a model image of a target/shelved product is one of the stored product images, each candidate image portion is matched with the model image to determine whether it contains the target/shelved product. Local feature matching or key point analysis can be used for product recognition (514). A number of key points are detected in both the model and patch images, and then matched against each other across the stored product images. Each key point is represented with a sBIP (Structured Binary Intensity Pattern) feature which is a 32-byte binary descriptor of the local feature. Descriptors of two key points can then be compared using a simple hamming operation. If there is a large enough number of matching key point pairs that fit to a homographic relation, the product can then be identified or determined (516). The number of key points to be matched can be a predetermined threshold number. Alternatively, the number of key points to be matched can be a predetermined percentage of the key points identified.

Figure 11:
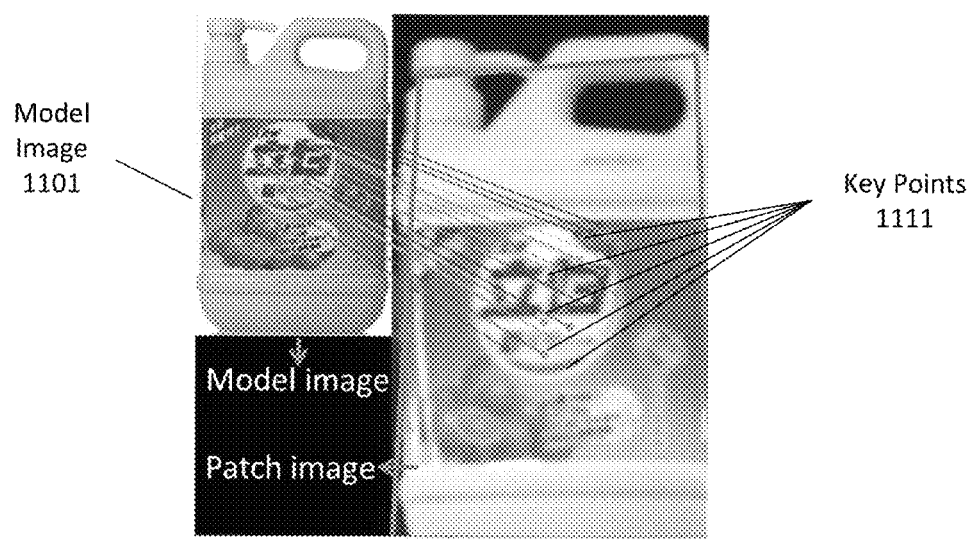
FIG. 11 illustrates example images showing key point matching for product detection.

Numerous alternate approaches can be used to detect the key points in the model and patch images. An example of a preferred approach is the ORB (Oriented FAST (Features from Accelerated Segment Test) and Rotated BRIEF (Binary Robust Independent Elementary Features)) method, which is a scale-invariant version of FAST, the high-speed corner detection algorithm. FIG. 11 illustrates an example candidate image portion, in which the product is identified through key point analysis. One or more aspects described above may be implemented through the use of instructions that are executable by one or more processors.

Figure 6:
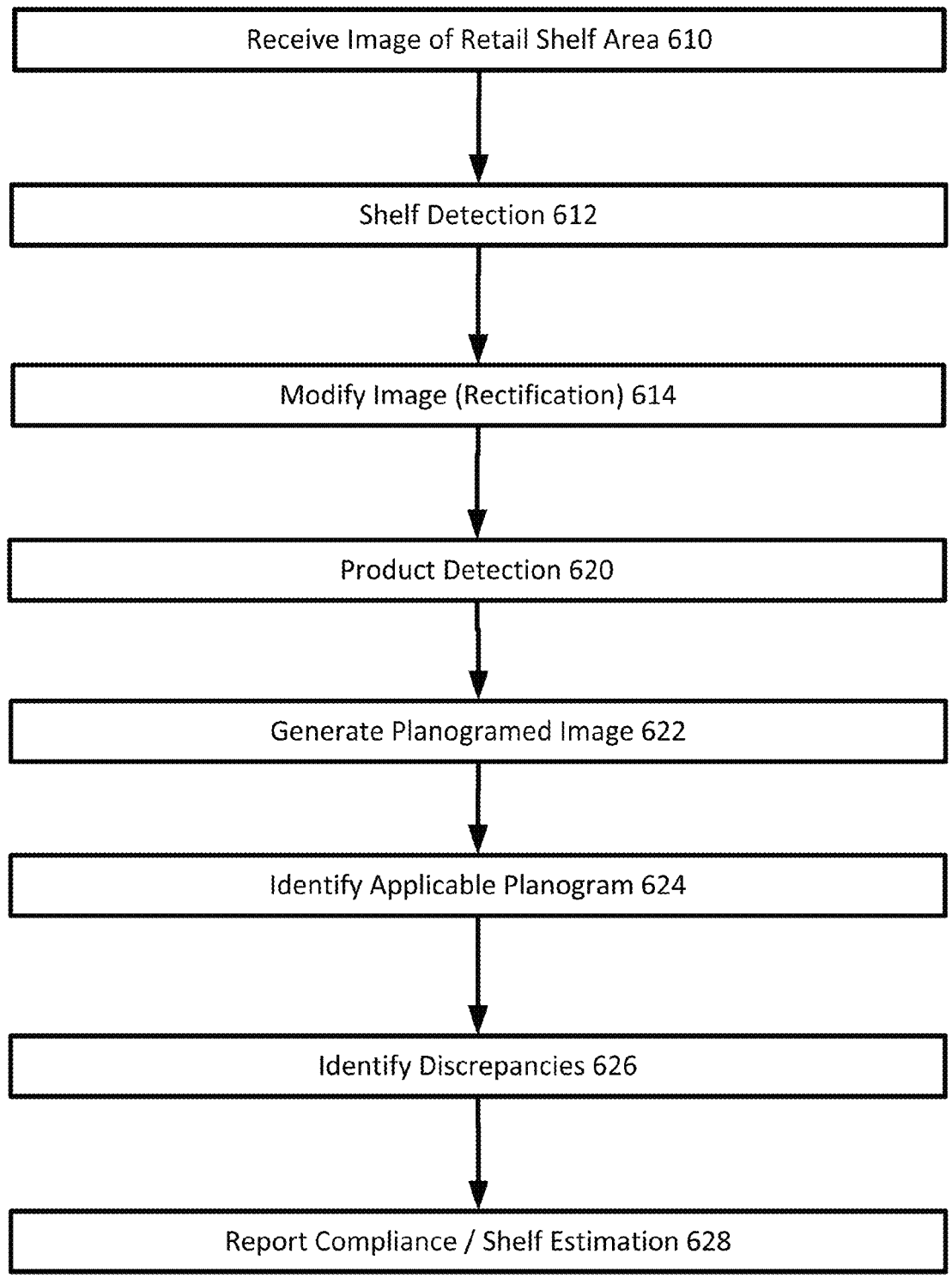
FIG. 6 illustrates an example overall flow for an embodiment of a method for processing an image of a retail shelf area to generate compliance information about applicable planograms.

FIG. 6 illustrates an example of a method of processing an image of a retail shelf area to generate compliance information about applicable planograms. An image of the retail shelf area is first received (610). Next, one or more shelves are determined to be depicted in a portion of the image in accordance with shelf detection (612) described in the context of FIG. 3 above. Then, the image is rectified so that the portion of the image depicting the one or more shelves is substantially parallel to a predefined horizontal reference frame in accordance with image rectification (614) described in the context of FIG. 4 above. One or more products are then detected in a remainder portion of the modified image, the remainder portion being separate from the portion of the image determined to depict the one or more shelves. The detection of the one or more products is performed in accordance with product detection (620) described in the context of FIG. 5 above. Once the products are determined in each of the candidate image portions, consecutive patches or candidate image portions on a detected shelf that are recognized as having the same shelved/target products can be merged together to form blocks. Using the location and sizes of these product blocks, a planogramed image can be generated (622) based on the determined products and the detected shelves. Next, an applicable planogram is identified (624) based on the one or more products detected and the portion of the image determined to depict the one or more shelves. The metadata attached to the image can also be used to identify the applicable planogram based on the location and date of the image capture. The planogramed image and the applicable planogram can then be compared to identify discrepancies (626) and generate compliance data (628). Compliance data can include information about the discrepancies in the layout of the product display on one or more shelves, estimation of shelf product shares and indications of gaps in product display. One or more aspects described above may be implemented through the use of instructions that are executable by one or more processors.

Figure 7:
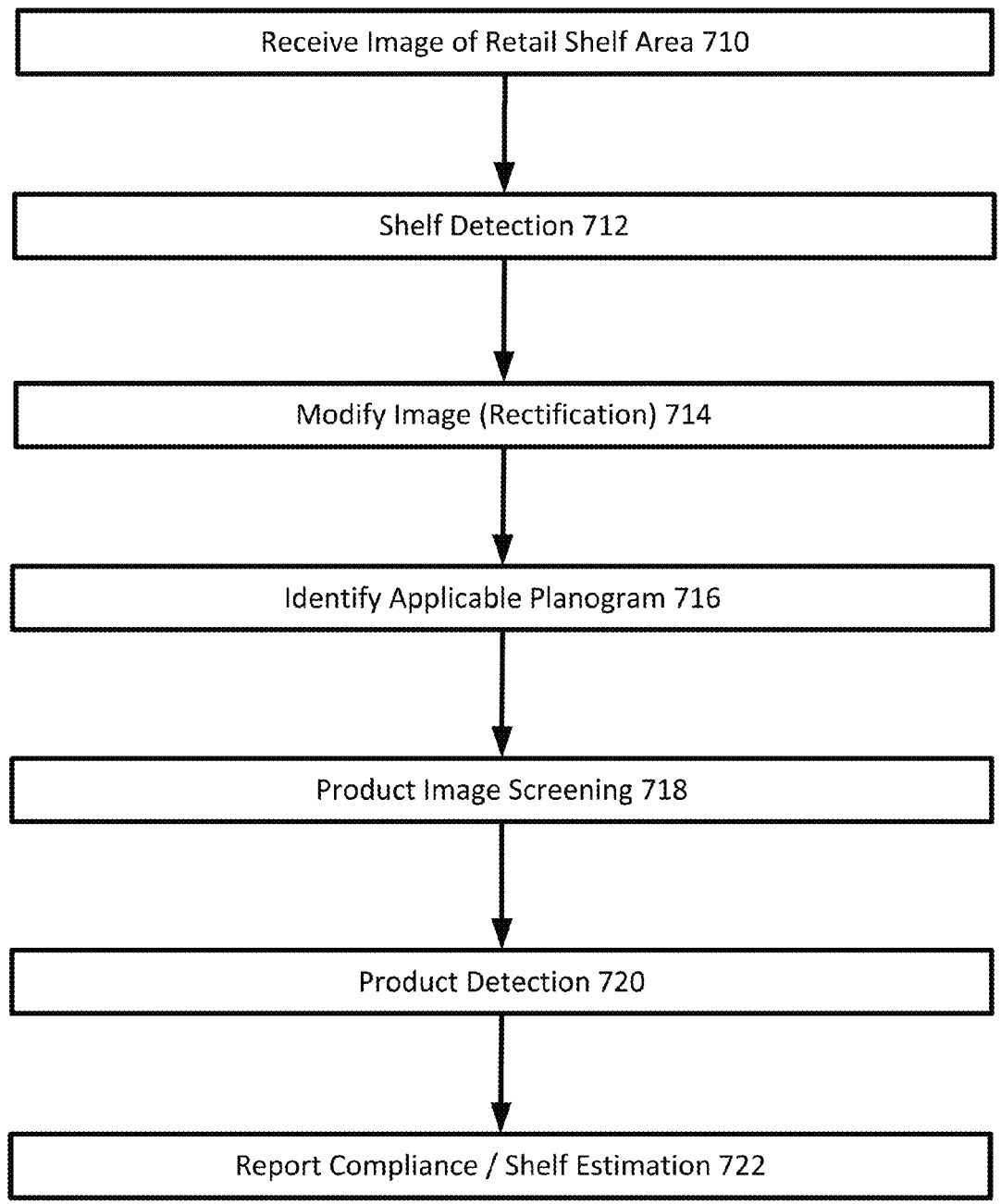
FIG. 7 illustrates an example overall flow for an alternate embodiment of a method for processing an image of a retail shelf area to generate compliance information about applicable planograms.

FIG. 7 illustrates an alternate example of a method of processing an image of a retail shelf area to generate compliance information about applicable planograms. An image of the retail shelf area is first received (710). Next, one or more shelves are determined to be depicted in a portion of the image in accordance with shelf detection (712) described in the context of FIG. 3 above. Then, the image is rectified so that the portion of the image depicting the one or more shelves is substantially parallel to a predefined horizontal reference frame in accordance with image rectification (714) described in the context of FIG. 4 above. Instead of detecting the products in the shelf layers of the modified image next, an applicable planogram is first identified (716) based on the metadata of the image and/or user input for location and date of the image of the retail shelf area. Once an applicable planogram is identified, the stored model product images are screened (718) to filter the model images corresponding to one or more target products that are identified in the applicable planogram. Using the filtered list of model images corresponding to the target products, one or more products are then detected in a remainder portion of the modified image, in accordance with product detection (720) described in the context of FIG. 5 above. A planogramed image is then generated to compare with the applicable planogram and compliance data is reported (722), as described above in the context of FIG. 6. One or more aspects described above may be implemented through the use of instructions that are executable by one or more processors.

Example Images

FIGS. 8A and 8B illustrates an example of shelves detected on an image of a retail shelf area, in accordance with aspects of shelf detection described herein. In this example, an image in FIG. 8A, depicting a retail shelf area in an angled and depthwise perspective is determined to depict shelves. The detected shelves 811 are marked in black on the image in FIG. 8B.

FIG. 9A through FIG. 9D illustrate examples of images that are rectified in accordance with aspects of image rectification described herein. FIG. 9A and FIG. 9C illustrate images of a retail shelf area, depicting the retail shelves at an angled and depthwise perspective. FIG. 9B illustrates the modified image of FIG. 9A after the shelf detection and image rectification steps described above. FIG. 9D illustrates the modified image of FIG. 9C after the shelf detection and image rectification steps described above. The detected shelves 911 (marked in black) in FIG. 9B and FIG. 9D are also transformed in the modified image using the same homographic matrix.

FIG. 10 illustrates example images showing color filtering in accordance with aspects of product detection described herein. A model image 1001 of the target product is compared with the candidate image portions or patches in the rectified image 1005 to exclude the color filtered patches 1033 and narrow them down to the color matched patches 1011.

FIG. 11 illustrates example images showing key point matching in accordance with aspects of product detection described herein. Key points on a model image 1101 of a target product is matched with the identified key points 1111 in the candidate image portions or patches to determine if the particular patch of the image contains the target product.

Computer System

Figure 12:
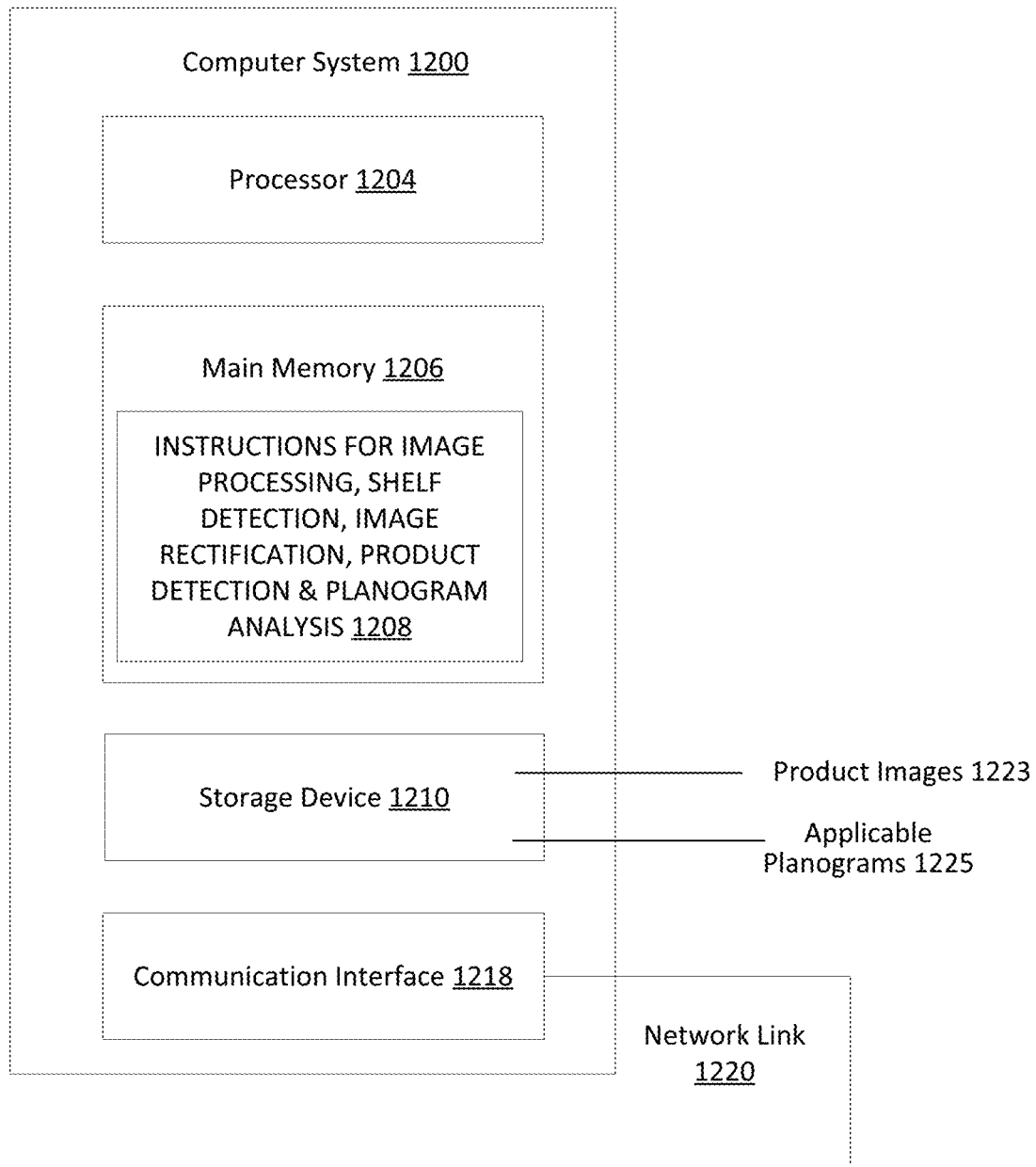
FIG. 12 illustrates a block diagram that illustrates an example computer system upon which examples described herein may be implemented.

FIG. 12 is a block diagram that illustrates a computer system upon which embodiments described herein may be implemented. For example, in the context of FIG. 1, system 100 may be implemented using one or more servers such as described by FIG. 12.

In an embodiment, computer system 1200 includes processor 1204, main memory 1206 (including non-transitory memory), storage device 1210, and communication interface 1218. Computer system 1200 includes at least one processor 1204 for processing information. Computer system 1200 also includes the main memory 1206, such as a random access memory (RAM) or other dynamic storage device, for storing information and instructions to be executed by processor 1204. For example, main memory 1206 can store instructions 1208 to receive images of a retail shelf area, detect shelves, rectify the image, detect products, and perform planogram analysis in accordance with some aspects. Main memory 1206 also may be used for storing temporary variables or other intermediate information during execution of instructions to be executed by processor 1204.

Computer system 1200 may also include a read only memory (ROM) or other static storage device for storing static information and instructions for processor 1204. The storage device 1210, such as a magnetic disk or optical disk, is provided for storing information and instructions. The storage device 1210 can store product images 1223 and applicable planograms 1225 that are used in accordance with some aspects. The communication interface 1218 may enable the computer system 1200 to communicate with one or more networks through use of the network link 1220 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., Wi-Fi and WiMAX networks).

Embodiments described herein are related to the use of computer system 1200 for implementing the techniques described herein. According to one embodiment, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for processing an image of a retail shelf area, the method being implemented by one or more processors and comprising:
   receiving an image of the retail shelf area, the image depicting the retail shelf area at an angled and depthwise perspective in relation to a point of image capture;
   determining a portion of the image that depicts one or more shelves in the retail shelf area in an angled alignment with respect to a predefined horizontal reference frame, to reflect the angled and depthwise perspective;
   based on the determination of the portion of the image depicting the one or more shelves, modifying the image to depict the one or more shelves as being parallel to the predefined horizontal reference frame;
   based on the modified image, detecting one or more products in a remainder portion of the image, separate from the portion of the image determined to depict the one or more shelves;
   determining a discrepancy of at least one product depicted in the remainder portion of the image with respect to a planogram of the retail shelf area; and
   generating an output that identifies the determined discrepancy.

2. The method of claim 1, wherein detecting the one or more products in the remainder portion of the modified image includes:
   identifying, in the remainder portion, a plurality of candidate image portions for depicting the one or more products; and
   analyzing each of the plurality of candidate image portions to determine the one or more products based on a plurality of stored product images.

3. The method of claim 2, wherein the analyzing each of the plurality of candidate image portions is based on a dominant color in each of the plurality of candidate image portions.

4. The method of claim 2, wherein the analyzing each of the plurality of candidate image portions is based on a number of key points identifiable in each of the plurality of candidate image portions.

5. The method of claim 2, wherein the analyzing each of the plurality of candidate image portions includes:
   identifying a dominant color in each of the plurality of candidate image portions; and
   determining a shelved product in each of the plurality of candidate image portions from the plurality of the stored product images after excluding the stored product images that do not contain the dominant color.

6. The method of claim 5, wherein the determining a shelved product in each of the plurality of candidate image portions from the plurality of the stored product images after excluding the stored product images that do not contain the dominant color includes:
   identifying a number of key points in each of the candidate image portions; and
   based on the identified key points, determining the shelved product in each of the plurality of candidate image portions from the plurality of stored product images after excluding the stored product images that do not contain the dominant color.

7. The method of claim 2, wherein analyzing each of the plurality of candidate image portions includes:
   identifying a number of key points in each of the candidate image portions; and
   determining a shelved product in each of the plurality of candidate image portions from the plurality of stored product images based on the identified key points.

8. The method of claim 7, wherein the number of key points is a predetermined threshold number.

9. The method of claim 1, further comprising:
   identifying a planogram applicable for the retail shelf area in the image.

10. The method of claim 1, wherein the detecting one or more products in a remainder portion of the modified image includes:
    identifying a planogram applicable for the retail shelf area in the image; and
    determining one or more products in the remainder portion of the modified image based on the applicable planogram.

11. The method of claim 10, wherein the determining one or more products in the remainder portion of the modified image based on the planogram includes:
    identifying one or more target products in the planogram;
    identifying, in the remainder portion, a plurality of candidate image portions for depicting the one or more products; and
    analyzing each of the plurality of candidate image portions to determine the one or more products, from a stored product images in a plurality of stored product images that correspond to the one or more target products.

12. The method of claim 11, wherein the analyzing each of the plurality of candidate image portions includes:
    identifying a dominant color in each of the plurality of candidate image portions;
    identifying a number of key points in each of the candidate image portions; and
    based on the identified key points, determining a shelved product in each of the plurality of candidate image portions, from the stored product images in the plurality of stored product images that correspond to the one or more target products, after excluding the stored product images that do not contain the dominant color.

13. A system for processing an image of a retail shelf area, comprising:
    a memory resource to store instructions; and
    one or more processors using the instructions stored in the memory resource to:
       receive an image of the retail shelf area, the image depicting the retail shelf area at an angled and depthwise perspective in relation to a point of image capture;
       determine a portion of the image that depicts one or more shelves in the retail shelf area in an angled alignment with respect to a predefined horizontal reference frame, to reflect the angled and depthwise perspective;
       based on the determination of the portion of the image depicting the one or more shelves, modify the image to depict the one or more shelves as being parallel to the predefined horizontal reference frame;
       detect one or more products in a remainder portion of the modified image, separate from the portion of the image determined to depict the one or more shelves;
       determine a discrepancy of at least one product depicted in the remainder portion of the image with respect to a planogram of the retail shelf area; and
       generate an output based on the determination of the discrepancy.

14. A non-transitory computer-readable medium for processing an image of a retail shelf area, the computer-readable medium storing instructions that, when executed by one or more processors, cause the one or more processors to perform operations that include:
- capturing an image of the retail shelf area, the image depicting the retail shelf area at an angled and depthwise perspective in relation to a point of image capture;
- determining a portion of the image that depicts one or more shelves in the retail shelf area in an angled alignment with respect to a predefined horizontal reference frame, to reflect the angled and depthwise perspective;
- based on the determination of the portion of the image depicting the one or more shelves, modifying the image to depict the one or more shelves as being parallel to the predefined horizontal reference frame;
- detecting one or more products in a remainder portion of the modified image, separate from the portion of the image determined to depict the one or more shelves;
- determine a discrepancy of at least one product depicted in the remainder portion of the image with respect to a planogram of the retail shelf area; and
- generating an output based on the determination of the discrepancy.

* * * * *